United States Patent
Yoshida

(10) Patent No.: US 7,602,576 B2
(45) Date of Patent: Oct. 13, 2009

(54) DATA READING METHOD AND STORAGE DEVICE

(75) Inventor: Osamu Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/801,701

(22) Filed: May 10, 2007

(65) Prior Publication Data

US 2008/0094746 A1 Apr. 24, 2008

(30) Foreign Application Priority Data

Oct. 24, 2006 (JP) .............................. 2006-288206

(51) Int. Cl.
*G11B 5/58* (2006.01)
*G11B 5/596* (2006.01)

(52) U.S. Cl. ................................. 360/77.01; 360/77.08

(58) Field of Classification Search ....................... None
See application file for complete search history.

(56) References Cited

U.S. PATENT DOCUMENTS

| | | | | |
|---|---|---|---|---|
| 5,353,170 A | * | 10/1994 | Fung et al. | ..................... 360/53 |
| 5,859,740 A | * | 1/1999 | Takeda et al. | ............. 360/77.02 |
| 5,956,200 A | * | 9/1999 | Kohno et al. | ............. 360/77.04 |
| 5,978,168 A | * | 11/1999 | Mathews et al. | .......... 360/77.04 |
| 6,437,947 B1 | * | 8/2002 | Uno | ........................ 360/78.04 |
| 6,643,084 B1 | * | 11/2003 | Andrew et al. | ................. 360/53 |
| 6,650,491 B2 | * | 11/2003 | Suzuki et al. | .................. 360/31 |
| 6,671,790 B2 | * | 12/2003 | Gay Sam et al. | ............. 711/202 |
| 6,717,760 B2 | * | 4/2004 | Hamaguchi et al. | ........... 360/31 |
| 7,088,535 B2 | | 8/2006 | Kim et al. | |

FOREIGN PATENT DOCUMENTS

| | | |
|---|---|---|
| JP | 2001-118343 | 4/2001 |
| JP | 2004-134077 | 4/2004 |

* cited by examiner

*Primary Examiner*—K. Wong
(74) *Attorney, Agent, or Firm*—Greer, Burns & Crain, Ltd.

(57) ABSTRACT

A disk drive correctly recognizes newly written data when a plurality of readable data exist on the same sector of the same track, by comparing AGC values of each of the readable data, comparing error rates generated by Viterbi decoding, or both. An offset value determining means determines whether an offset value when the data is read has exceeded a predetermined value when the data is read. An offset control means controls the head, on the basis of the determination result of the offset value determining means, to conduct the offset operation on the opposite side of the track when the data is read the first time, and a selecting means selects the new data recorded in the sector by comparing the results obtained for both sets of data.

14 Claims, 5 Drawing Sheets

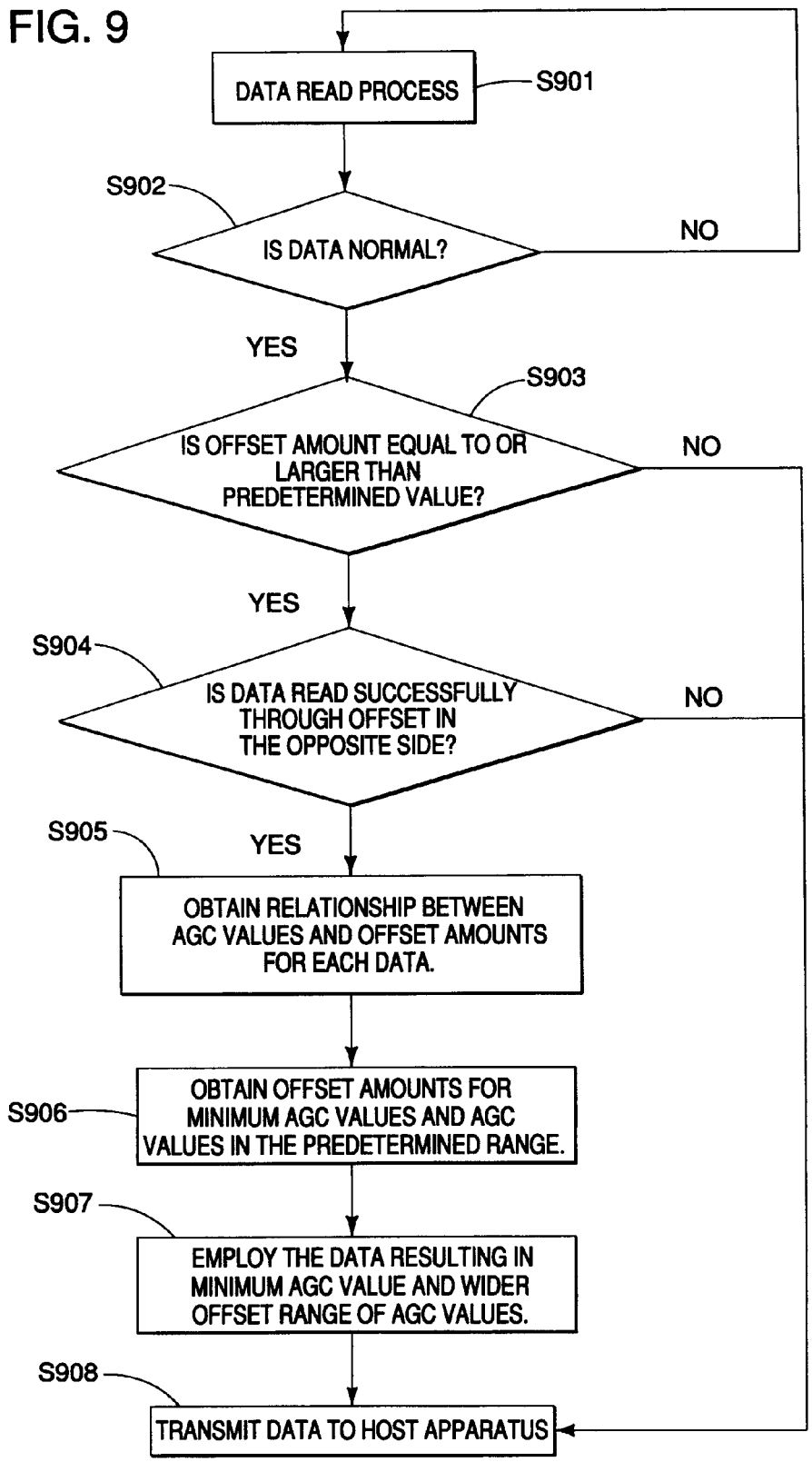

DATA READING METHOD AND STORAGE DEVICE

FIELD OF THE INVENTION

The present invention relates to a data reading method for storage devices such as a hard disk drive, and more specifically to a data reading method and a storage device suitable for reading data written when the head is deviated from the center position of a track due to external influences such as vibration or the like.

BACKGROUND OF THE INVENTION

In a hard disk drive, the data transferred from a host apparatus is stored and read. The data is divided into predetermined data lengths (each called a sector), in regions of tracks formed in rings, each track having a predetermined width on a storage medium.

If external factors such as vibration, shock or the like do not occur during the write process, the data is stored in alignment with the center in the width direction of the track. However, if an external factor such as vibration is generated, data is stored in a position deviated from the center of the track (FIG. 3).

To correctly read data recorded off-center, i.e., deviated from the center of the track as explained above, a method called offset read has been proposed. Data is read by displacing the read head in the width direction as much as the deviation of the data from the center of the track. One technique reads data by accurately obtaining the displacement (amount of offset), as proposed in Japanese Unexamined Patent Publication No. 2004-134077.

However, in recent years, hard disk drives have been utilized not only in stationary installation type servers and personal computers, but also in home electric appliances. Therefore, the operating environment of the hard disk drive is diversified and a shock which is larger than that usually applied to the stationary installation type apparatus of the prior art may sometimes be applied, particularly in a car-navigation apparatus or the like during operation thereof.

In order to write data to the center position of the track as correctly as possible, the head position is calculated using servo information (401 in FIG. 4). Writing of data is suspended if displacement of the head position exceeds a predetermined value due to shock or the like, and the write process is retried after vibration has been eliminated.

However, it takes some amount of time to detect such a failure, and data may be written until the write process is suspended. Data over-written in the retry process due to detection of an error or the subsequent write process of different data is done with no erase process. If data is written off-track in the direction from the track center opposite the preceding data write direction during a retry process or the like, the old data is sometimes not over-written and is left as it is. Accordingly, if the data width required by the read head is still left, the old data may sometimes be read erroneously, if the head is positioned on the old preceding data during the subsequent data read operation.

Therefore, even though the amount of offset is acceptable and allows for correct positioning of the head on the data, irregularity is found in the data, or a serious event such as system failure is likely generated, if erroneous old data read out by positioning the head thereto is transmitted to a host apparatus.

Accordingly, it is an object of the present invention to provide a storage device which reads the latest correct data even if a plurality of read data exists on the same sector.

SUMMARY OF THE INVENTION

In keeping with one aspect of this invention, a storage device is provided with a head for reading data from a storage medium. An offset control means offsets the head by a predetermined distance in the width direction of tracks for storing the data, and a data determining means determines whether the data read process has been completed successfully. An offset value determining means determines whether the offset value of the head has exceeded the predetermined value when the data read process has been completed successfully. The offset control means controls the head to conduct the offset operation to the opposite side of the track when the offset value determining means has determined that the offset value has exceeded the predetermined value, and the head conducts the data read process on the same sector again.

Therefore, when data is read on a certain sector, it is possible to verify whether different read data exists on the same sector and thereby reliability of the data obtained can be improved.

The present invention can also have compensating means for compensating the data read out with the head, such as automatic gain control (AGC) or the like, and selecting means for selecting data from a plurality of data read out with the head. The offset control means controls the head to conduct offset operations within a predetermined range on the track. Upon successful completion of a plurality of data read operations on the same sector, the head conducts the data read process at the predetermined offset position, and the selecting means selects data from a plurality of the data on the basis of the operation result of the compensating means.

Accordingly, even when a plurality of data is read successfully from the same sector, it is possible to select the correct data and then send the correct data to a host apparatus.

According to the present invention, only the latest correct data can be read easily even when a plurality of data are written in a readable state on the same sector of the same track. Thereby, reliability of the storage device can be further improved.

Therefore, since undesirable events due to failure generated in the data can be avoided, the present invention can improve reliability for the system as a whole where the storage device of the present invention is used.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIG. 9 is a flowchart of the read process for off-track data.

DETAILED DESCRIPTION

Figure 1:
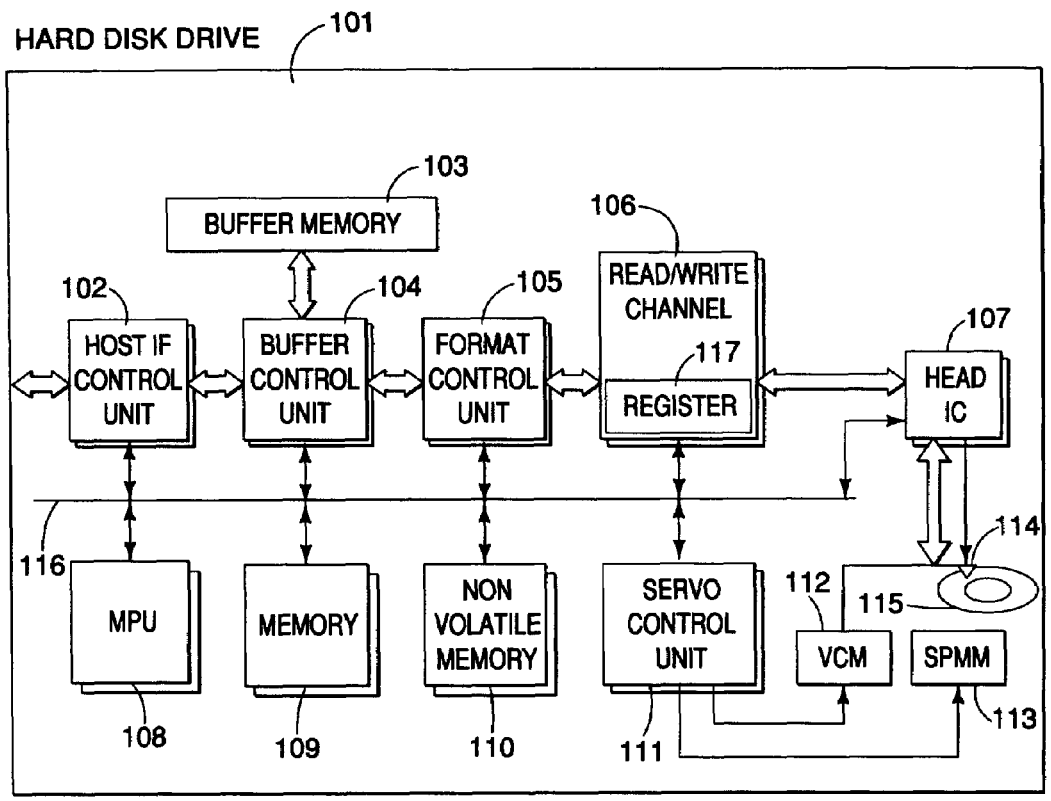
FIG. 1 is a block diagram of a hard disk drive.
Figure 2:
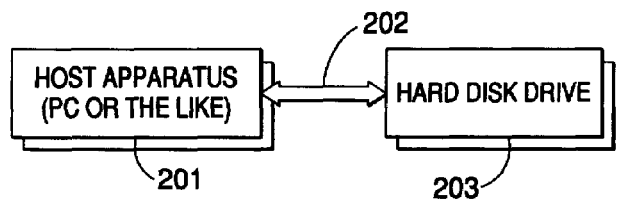
FIG. 2 is a diagram showing the connection of the hard disk drive of FIG. 1 to a host apparatus.

The hard disk drive of the present invention will be explained below using a block diagram (FIG. 1) showing an internal structure of a hard disk drive 101.

A host interface control unit 102 controls the host interface connected to a host apparatus. A buffer memory 103 stores data, and buffer memory control unit 104 controls the buffer 103. A format control unit 105 executes ECC calculations or the like. A read/write channel 106 demodulates the read data and amplifies the data to a predetermined value. A head IC 107 controls an output from the head.

A microprocessor 108 controls the hard disk drive. A volatile memory 109 stores data used and developed by the microprocessor 108, and a control program. The processes of the present invention including those described in FIG. 9, are performed largely by these components. A non-volatile memory 110 stores part of the control program and the data or the like used for power up and down processes.

A servo control unit 111 controls operations of a spindle motor (SPM) 113 and voice coil motor (VCM) 112. The voice coil motor (VCM) 112 drives a head actuator. The spindle motor (SPM) 113 rotates a storage medium 115. A head 114 executes write and read processes to and from the storage medium 115, which stores data. A common bus 116 connects the control units and memory or the like. A register 117 stores values (automatic gain control (AGC) values) used to amplify signals read by the read head to provide an acceptable signal through the read/write channel.

Read and write operations of data when a host apparatus 201 and a hard disk drive 203 (such as the drive 101 of FIG. 1) are connected through a host interface 202 will now be explained.

When the data read process is executed in response to an instruction from the host apparatus, the head 114 is positioned to a predetermined position on the storage medium 115 by the voice coil motor 112 so that data can be read. The data read from the medium is sent to the read/write channel 106 through the head IC 107 and is then demodulated. Thereafter, error detection and correction processes are executed with the ECC calculation or the like in the format control unit 105. The data, when it is the correct data, is first stored in the data buffer 103 through the buffer control unit 104. Subsequently, the data is transferred to the host apparatus via the buffer control unit 104 and host interface control unit 102.

On the other hand, when the host apparatus issues an instruction for a write operation, the data transferred from the host apparatus is first stored in the data buffer 103 via the host interface control unit 102 and buffer control unit 104. Thereafter, the data is written, via the buffer control unit 104 again, on to the storage medium 115, with a timing suitable for execution of the write process to the storage medium 115, via the format control unit 105, read/write channel 106, and head IC 107 or the like in the reverse sequence of the read operation.

Figure 3:
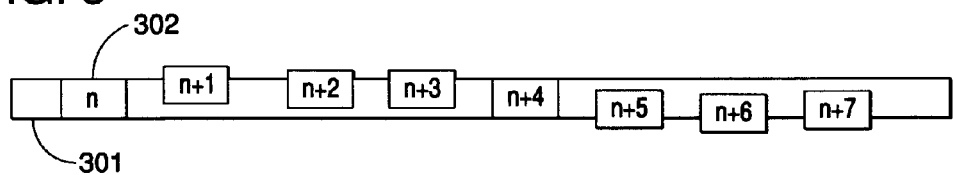
FIG. 3 is a diagram showing an arrangement of sectors on a track in the disk drive of FIG. 1.

Data is stored in sectors n . . . n+7 in FIG. 3. The data is not normally stored at the center of a track 301, as with a sector 302 in FIG. 3, but particularly if shock or vibration is applied to the hard disk drive 101 during the write operation explained above, the data is stored near the track center, on either of the opposite sides of the track. The distance between the center of the track and the center of a sector is known as the offset. As seen in FIG. 3, n+1, n+2, and n+3 are on one side of the centerline of the track 301, and sectors n+5, n+6, and n+7 are on the opposite side of the centerline of the track 301.

Figure 4:
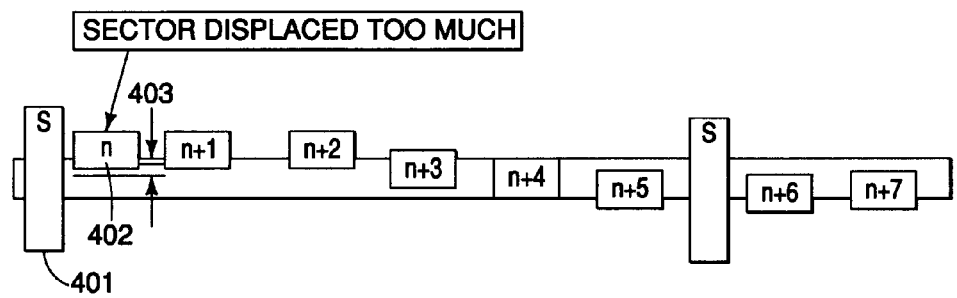
FIG. 4 is a diagram used to describe an off-track check operation where the first sector is excessively displaced.

In FIG. 4, sector 402(n) immediately follows servo information 401. The sector or data segment 402 is offset from the center of the track by a distance 403. If the distance 403 exceeds a predetermined amount, the data will be rewritten to the sector.

Figure 5:
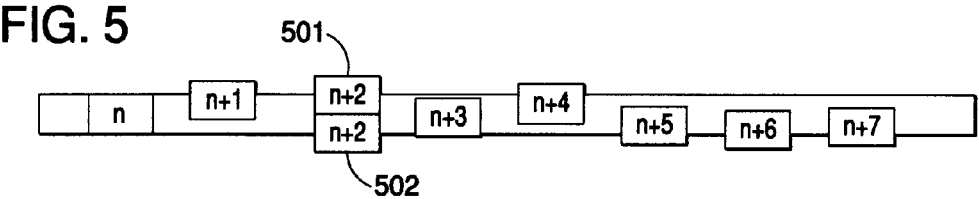
FIG. 5 is a diagram of an arrangement of sectors where a plurality of readable data exists on the same sector.

In addition, when a retry or the like is implemented, it is probable that old data and new data will be arranged such that both old and new data can be read from the same sector, as shown by sectors 501, 502 (k+2/l+2) in FIG. 5.

Figure 6:
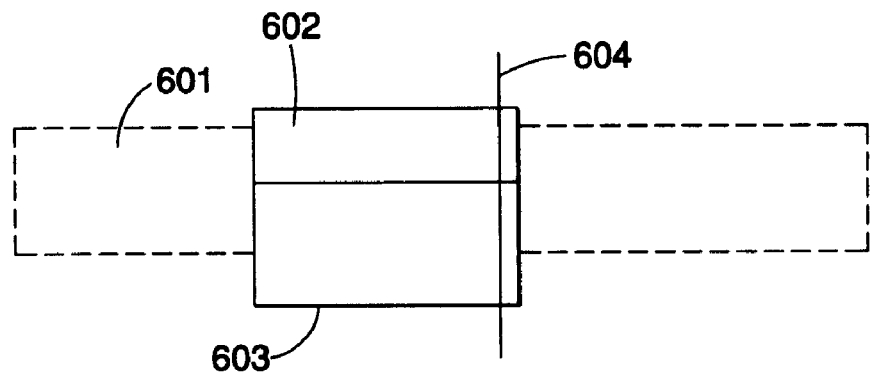
FIG. 6 is a diagram illustrating the state where multiple data exists on the same sector.

Operation principles of the present invention will be explained in detail with reference to FIG. 6 and FIG. 7. FIG. 6 shows the state where both old data 602 and new data 603 are written with displacement on the same sector of the same track 801. When the old and new data are written with overlap by the write process, a part of the old data 602 is overwritten by the new data 603. Therefore, the old data 602 characteristically becomes narrower in width.

If the write head and the read head deal with data of the same width, an AGC value showing the amount of signal amplification (i.e., compensation) in the read/write channel becomes high, because an input value is lower during the read process of the old data 602. However, in typical conventional read heads, the width of the read head is about half that of the write head width. Accordingly, when the width of the old data 602 is larger than the read width of the read head, the minimum values of the AGC values of old and new data become almost equal to each other in some cases. In that case, it is impossible to simply judge the old data from the new data using only the minimum values.

It is desirable, therefore, to execute the process for distinguishing the old from the new data based on the fact that the new data 603 is wider than the old data 602. Namely, it is possible to correctly identify the new data 603 by checking the offset of data where the AGC value becomes a minimum, or the wider offset range of data where the AGC values are distributed within a predetermined range from the minimum value.

Figure 7:
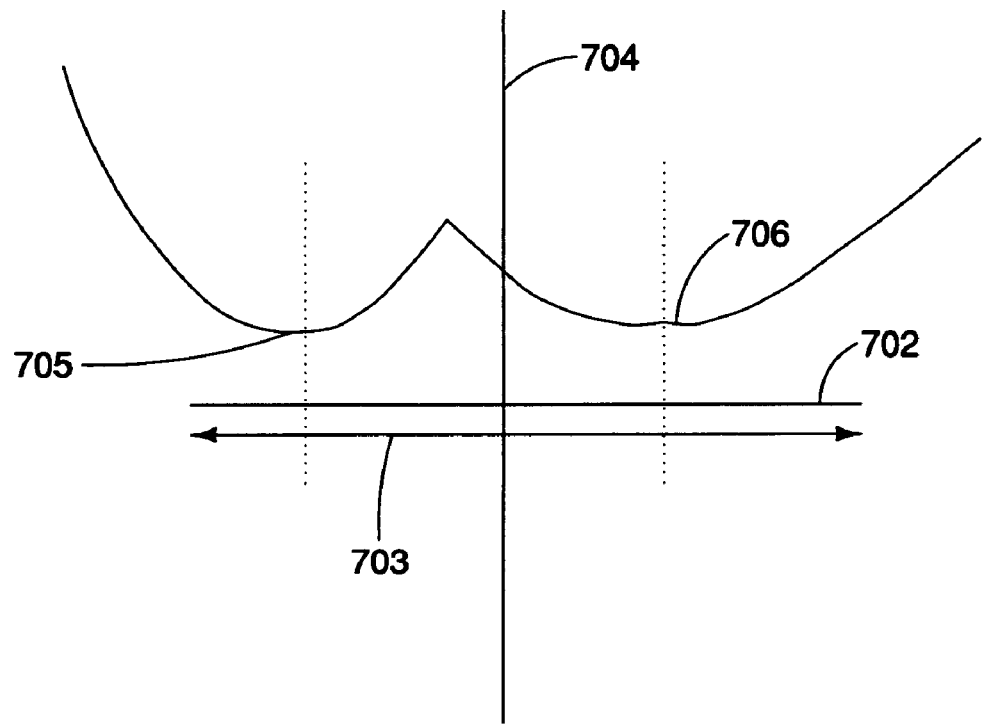
FIG. 7 is a diagram showing changes in AGC values due to changes in the amount of offset in the sector of FIG. 6.

FIG. 7 is a graph indicating the changes of the AGC values when the data read operation is conducted by scanning the head across a predetermined range of the data to be read along the line 604 in FIG. 6 in the directions indicated by the arrow 703 in FIG. 7. The AGC values are plotted on the vertical axis (704) and the amount of offset from the center of the track is plotted on the horizontal axis (702). The graph has two dips which reflect the data width on the track respectively having the centers (705, 706) of old data 602 and new data 603, respectively, and the minimum values of the old and new data.

The old and new data can be identified easily by obtaining and comparing the AGC values for the minimums in each offset range, or the distribution of AGC values from the minimum values. In other words, the new and old data can be identified by comparing the widths of the AGC graphs for the old and new data.

Operation of the present invention based on the principle explained above will be explained in detail on the basis of the flowchart of FIG. 9.

When the data read process is executed (S901), whether the data is defective is verified (S902). When the data is defective, read conditions such as the offset value or the like are changed and the read operation is executed again for the specified number of times in step S902.

Meanwhile, when the data is normal, whether the amount of offset in the data read process has exceeded the predetermined value (for example, 10% of the track width) is determined (S903). When the data read process is completed successfully under the condition that the amount of offset has exceeded the predetermined value, the head is offset in the opposite direction to check whether data read operation is possible using the other offset value (S904).

When the data can also be read from the opposite direction, it can be recognized that a plurality of readable data exist on the same sector. It can also be recognized, based on this result, that defective data is stored in the storage medium in addition to the normal data.

Subsequently, the AGC values at each offset position are obtained by conducting the data read process through offset operations of the head within the readable range (S905).

Thereafter, the minimum AGC values corresponding to respective data and the distribution of AGC values over the range of offset amounts where the AGC values are minimized or are within predetermined distribution ranges are obtained using the relationships between the offset amounts and the AGC amounts explained above (S906).

The data resulting in the minimum read head output value (maximum AGC value), and wider distribution of relatively low values (maximum AGC values) over a range of offset amounts under the condition explained above is used to identify the newly written data (S907) and this data is sent to the host apparatus (S908).

As explained above, according to the first embodiment, the correct data can be read even when a plurality of readable data exists on the same sector of the same track and thereby various system failures resulting from defective data can be avoided.

Figure 8:
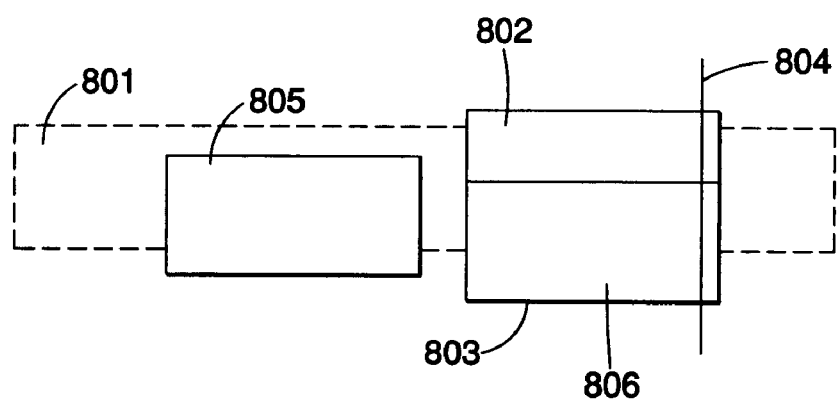
FIG. 8 is a diagram of a sector preceding a sector having multiple data on the same sector.

FIG. 8 is a second embodiment of the present invention in which old data 802 and new data 803 are written with a certain displacement on the same sector of the same track 801 and the off-track state of data on a sector 805 just preceding the sector 806 explained above are indicated. The AGC values taken along line 804 are similar to those taken along line 604 in FIG. 6.

In this embodiment, the new and old data can be judged more accurately by judging the new and old data on the basis of the first embodiment explained above, and by also conducting the determination process using the off-track state of the data on the sector 805 just preceding the sector 806 explained above.

Namely, the new data 803 can be identified more accurately by utilizing the characteristic that when a defective data write process is detected on a certain sector during a continuous data write process on the track, the just preceding data may also be written with a certain amount of track offset on the same side of the track as the new data.

Accordingly, the new data can be identified more accurately by further determining whether the offset direction of the data determined as the new data is matched with the offset direction of the just preceding data, after conducting the new and old data determining process of the first embodiment explained above.

In the first and second embodiment of the present invention, the AGC value has been used for explanation, but it is also possible to determine the new and old data by utilizing the number of times correction through Viterbi decoding is needed, instead of utilizing the AGC values.

Viterbi decoding is the process used for reading the data from the storage medium 115. The data is decoded to the value having the "distance" nearest to the read value. Therefore, the data can be determined based on whether the head output signal is stabilized, or the error generation rate is relatively low, by obtaining the number of times the "distance" has a value larger than a certain threshold value (in other words "far"). When new and old data are recorded on the same sector, the new data can be expected to be more stable and have fewer errors.

Accordingly, as in the case where the AGC value is used, which data is correct can be determined by using the relationship between the number of times of correction of the Viterbi decoding and the offset amount. In addition, the more accurate data can be obtained by using a combination of both the AGC value and the number of times correction is needed during execution of the Viterbi decoding.

In addition, it is possible to resolve a situation in which plural data can be read from the same sector by re-writing the data identified as the normal data to the sector and verifying that the data can be read within a predetermined offset range. Moreover, the situation where a plurality of data can be read from the same sector can be resolved by re-writing the data from the host apparatus and verifying that the data can be read within the predetermined range as explained above.

While the principles of the invention have been described above in connection with specific apparatus and applications, it is to be understood that this description is made only by way of example and not as a limitation on the scope of the invention.

What is claimed is:

1. A storage device for reading data from tracks on a storage medium, the tracks having a width and including sectors, comprising:
    a head for reading data from the sectors of the storage medium;
    a control unit for controlling a process comprising the steps of:
    setting the head within a predetermined distance in a first width direction of the track center;
    causing the head to read a first data from a selected sector within the predetermined distance in the first width direction of the track center;
    moving the head in a second width direction, which opposes the first width direction relative to the track center, when the control unit determines that an offset value has exceeded a predetermined value;
    causing the head to read a second data from the selected sector within the predetermined distance in the second width direction of the track center; and
    identifying one of the first data and the second data as new data, when the first data is different from the second data.

2. The storage device according to claim 1, wherein the control unit compensates amplitude of the first data and the second data read from the sector; and determines the new data on the basis of the compensating result.

3. The storage device according to claim 2, wherein the control unit determines the new data from a plurality of the data including the first data and the second data by identifying the data showing the minimum compensating value of the compensating result.

4. The storage device according to claim 1, wherein the control unit determines the new data from a plurality of the data including the first data and the second data based on the data having the wider range where the compensating value is equal to a predetermined value or less.

5. The storage device according to claim 1, wherein
    the control unit identifies the new data based on whether the head is displaced in the same direction from the track center as the data located before the new data.

6. The storage device according to claim 2, wherein the data control unit determines, from the plurality of data read from the sector, the data which results in minimum compensation assures the wider range where the amount of compensation is equal to the predetermined amount or less, and selects the data in the same direction as an offset direction of data located before the plurality of data on the track.

7. The storage device according to claim 2, wherein the control unit identifies the new data by decoding the first data and the second data and comparing the error rates encountered in the first data and the second data, the new data having a lower error rate.

8. A method of reading data from tracks on a storage medium in a storage device, the tracks having a track width and including sectors, comprising the steps of:

setting a head within a predetermined distance in a first width direction of a track center and reading a first data from a selected sector within the predetermined distance in the first width direction of the track center with the head;

moving the head in a second width direction, which opposes the first width direction relative to the track center, when a control unit determines that an offset value has exceeded a predetermined value;

reading a second data from the selected sector within the predetermined distance in the second width direction of the track center with the head; and identifying one of the first data and the second data as new data, when the first data is different from the second data.

9. The data reading method according to claim 8, further comprising the steps of:

compensating the data read from the storage device; and determining the new data from the plurality of data in the same sector on the basis of the compensating result.

10. The data reading method according to claim 9, wherein the determining step determines the new data, from the plurality of data including the first data and the second data in the same sector, by identifying the data showing the minimum compensation value.

11. The data reading method according to claim 9, wherein the determining step determines the new data from the plurality of data including the first data and the second data based on the data having the wider range where amount of compensation is equal to the predetermined amount or less.

12. The data reading method according to claim 8, wherein the determining step identifies the new data based on whether the head is displaced in the same direction from the track center as the data located before the new data.

13. The data reading method according to claim 8, wherein the determining step determines, from the plurality of data including the first data and the second data read from the sector, the data which results in minimum compensation in the compensating step, assures the wider range where amount of compensation is equal to the predetermined amount or less, and selects the data in the same direction as the offset direction of the data located before the plurality of data on the track.

14. The data reading method according to claim 9, wherein the compensating step identifies the new data by decoding the first data and the second data and comparing the error rates encountered in the first data and second data, the new data having a lower error.

* * * * *